(12) United States Patent
Hafen et al.

(10) Patent No.: US 7,345,392 B2
(45) Date of Patent: Mar. 18, 2008

(54) SPINDLE MOTOR HAVING A HYDRODYNAMIC BEARING SYSTEM

(75) Inventors: Martin Hafen, Spaichingen (DE);
Joerg Hoffmann, Mettlach (DE);
Andreas Kull, Donaueschingen (DE);
Tobias Kirchmeier, Dunningen (DE);
Rudolf Neumann, Spaichingen (DE);
Thilo Rehm, Villingen-Schwenningen (DE); Olaf Winterhalter, Epfendorf (DE)

(73) Assignee: Minebea Co., Ltd., Nagano-ken (JP)

( * ) Notice: Subject to any disclaimer, the term of this patent is extended or adjusted under 35 U.S.C. 154(b) by 144 days.

(21) Appl. No.: 11/092,299

(22) Filed: Mar. 29, 2005

(65) Prior Publication Data

US 2005/0225187 A1    Oct. 13, 2005

(30) Foreign Application Priority Data

Apr. 8, 2004   (DE) .................... 10 2004 017 356

(51) Int. Cl.
*H02K 5/16* (2006.01)
*H02K 7/08* (2006.01)
*F16C 17/02* (2006.01)

(52) U.S. Cl. .................... 310/90; 384/107; 384/112

(58) Field of Classification Search .......... 310/90, 310/90.5, 91, 98, 99, 67 R; 384/100, 107, 384/112, 104, 105; 360/98.07
See application file for complete search history.

(56) References Cited

U.S. PATENT DOCUMENTS

| | | | | |
|---|---|---|---|---|
| 3,503,658 A | * | 3/1970 | Remmers | 384/113 |
| 5,558,445 A | * | 9/1996 | Chen et al. | 384/132 |
| 5,623,382 A | * | 4/1997 | Moritan et al. | 360/99.08 |
| 6,126,320 A | * | 10/2000 | Ichiyama | 384/112 |
| 6,296,390 B1 | * | 10/2001 | Wolff et al. | 384/112 |
| 6,874,940 B2 | * | 4/2005 | Rahman et al. | 384/110 |
| 6,920,013 B2 | * | 7/2005 | Nishimura et al. | 360/99.08 |
| 6,921,996 B2 | * | 7/2005 | Parsoneault et al. | 310/90 |
| 6,962,442 B2 | * | 11/2005 | Braun | 384/110 |
| 7,056,024 B2 | * | 6/2006 | Weingord et al. | 384/100 |
| 7,073,945 B2 | * | 7/2006 | Aiello et al. | 384/107 |
| 7,095,147 B2 | * | 8/2006 | Aiello et al. | 310/90 |
| 7,218,023 B2 | * | 5/2007 | Hirose et al. | 310/90 |
| 7,224,552 B2 | * | 5/2007 | Herndon et al. | 360/98.08 |
| 2002/0175577 A1 | * | 11/2002 | Yoshitsugu et al. | 310/90 |
| 2003/0174439 A1 | * | 9/2003 | Kull | 360/99.08 |
| 2003/0174637 A1 | * | 9/2003 | Kull et al. | 369/269 |

(Continued)

FOREIGN PATENT DOCUMENTS

JP       2002147440 A   *   5/2002

(Continued)

*Primary Examiner*—Karl Tamai
(74) *Attorney, Agent, or Firm*—Cooper & Dunham LLP

(57) ABSTRACT

The invention relates to a spindle motor having a hydrodynamic bearing system, particularly to drive platters in a hard disk drive, the platters being disposed on a rotor, and the bearing system being formed by a bearing sleeve arranged on a baseplate and a shaft rotatably supported in an opening in the bearing sleeve and at least one thrust plate connected to the shaft. A liquid lubricant is filled into a bearing gap formed between the shaft, the thrust plate and the bearing sleeve. The invention is characterized in that the thrust plate rests directly against the rotor and is accommodated in an annular recess in the bearing sleeve facing the rotor.

17 Claims, 6 Drawing Sheets

U.S. PATENT DOCUMENTS

| | | | |
|---|---|---|---|
| 2003/0174914 A1* | 9/2003 | Kull et al. | 384/107 |
| 2003/0184175 A1* | 10/2003 | Horiuchi et al. | 310/90 |
| 2004/0012287 A1* | 1/2004 | Kloeppel et al. | 310/90 |
| 2004/0028301 A1* | 2/2004 | Kull et al. | 384/107 |
| 2004/0264819 A1* | 12/2004 | Weingord et al. | 384/107 |
| 2005/0006969 A1* | 1/2005 | Kull | 310/90 |
| 2005/0225187 A1* | 10/2005 | Hafen et al. | 310/90 |

FOREIGN PATENT DOCUMENTS

| | | | |
|---|---|---|---|
| JP | 2003-74543 | * | 3/2003 |
| JP | 2003092867 A | * | 3/2003 |
| JP | 2003092868 A | * | 3/2003 |
| JP | 2004011897 A | * | 1/2004 |

\* cited by examiner

SPINDLE MOTOR HAVING A HYDRODYNAMIC BEARING SYSTEM

BACKGROUND OF THE INVENTION

The invention relates to a spindle motor having a hydrodynamic bearing system, particularly a spindle motor to drive the platters in a hard disk drive according to the preamble of patent claim 1.

PRIOR ART

A spindle motor having a hydrodynamic bearing system, as revealed for example in DE 202 11 588 U1, comprises a stationary baseplate on which a stator arrangement consisting of a stator core and windings is arranged. A shaft is rotatably accommodated in a bearing sleeve. A rotor is disposed at the free end of the shaft, one or more platters (not illustrated) of the hard disk drive being arranged and fixed on the rotor. An annular permanent magnet having a plurality of pole pairs is arranged at the lower inside edge of the rotor hub, an alternating electrical field being applied to the pole pairs by a stator arrangement spaced apart from them by means of an air gap, so that the rotor, together with the shaft, is put into rotation. A bearing gap remains between the inside diameter of the bearing sleeve and the outside diameter of the shaft, the bearing gap being filled with a lubricant. The hydrodynamic bearing arrangement includes radial bearing regions formed between the bearing sleeve and the shaft and axial bearing regions formed by a thrust plate connected to the shaft. A cover plate seals the entire bearing arrangement from below so that no lubricant can escape from the bearing gap.

As a rule, the rotor is connected to the shaft by means of an interference fit. When the rotor is mounted onto the shaft, it is important to ensure that the rotational axes of rotor and shaft coincide with each other so that the rotor is not seated at an angle on the shaft. Due to the short joint length between the rotor and the shaft, however, it could happen that the rotor tilts with respect to the shaft when the platters are mounted onto the rotor, resulting in an increase in the radial and axial runout.

This problem can be at least partially circumvented by increasing, for example, the length of the joint between the rotor and the shaft. If the overall length of the motor remains the same, however, the useful length of the radial bearing is decreased as a consequence, which leads to other well-known problems, such as reduced bearing stiffness.

The use of capillary seals to seal the bearing gap is well-known. Relevant design proposals can be found in DE 202 11 588 U1 and U.S. Pat. No. 5,667,309 A. The capillary seal suggested in the latter document, however, reduces the effective useful length of the bearing due to the design of the tapered space which is aligned axially inwards.

SUMMARY OF THE INVENTION

It is thus the object of the invention to provide a spindle motor having a hydrodynamic bearing system that allows the rotor to be fixed to the shaft in a tilt-proof process, without requiring a reduction in the effective length of the bearing.

This object has been achieved according to the invention by the characteristics outlined in patent claim 1.

A characteristic feature of the invention is that the thrust plate of the bearing system rests directly against the rotor and is accommodated in a recess in the bearing sleeve that faces the rotor.

This arrangement of the rotor and the thrust plate at the same end of the shaft means that when the platters are mounted onto the rotor, the rotor does not tilt as easily with respect to the shaft. The rotor rests directly against the thrust plate, which in turn rests directly against the bearing sleeve when the motor is stationary (particularly during assembly). This goes to increase the effective joint length between the shaft and the rotor, thus always ensuring correct alignment of the rotor and thrust plate with respect to the shaft, without it being necessary to shorten the available length of the bearing. When the motor is in operation, a bearing gap is formed between the thrust plate and the bearing sleeve.

The rotor and the thrust plate are designed as separate components. To form an axial bearing region, a bearing surface running approximately perpendicular to the rotational axis is formed on the bottom of the annular recess in the bearing sleeve, this bearing surface interacting with a bearing surface provided on the end face of the thrust plate. A bearing gap running in an approximately radial direction is formed between the bearing surfaces. The sections of the bearing surfaces of the bearing sleeve and of the thrust plate that extend radially inwards can merge into sections extending obliquely to the rotational axis, the region of the bearing gap extending radially merging into the region of the bearing gap extending axially.

As an alternative, the axial bearing can also be designed as an obliquely aligned conical seal.

A depression is provided in the bearing surface on the sleeve taking the form of an annular groove. An annular space adjoins the annular groove, the annular space being tapered and widening in the direction towards the end face of the bearing sleeve. The annular groove is completely filled and the tapered space is at least partially filled with lubricant. The groove and the tapered space form a reservoir and an equalizing volume for the lubricant. The tapered space additionally forms a capillary seal for the bearing gap.

To make additionally sure that no lubricant sprays out of the tapered space, the tapered space is covered by a covering cap which has an approximately L-shaped cross-section and which is set on the end face of the bearing sleeve. In addition, the covering cap has the function of limiting the evaporation of the lubricant.

A further function of the covering cap is to prevent the shaft from leaving the bearing in an axially upward direction.

The tapered space can, however, also be covered by a flat cover disk that is fixed to the inner circumference of the bearing sleeve.

At the closed end of the bearing, a cavity connected to the bearing gap is preferably provided, the cavity being filled with lubricant and connected to the annular groove and the tapered space via connecting channels.

If the bearing requires greater resistance to axial stress, a second plate can be provided at the closed end of the bearing system, the circumference of the plate projecting beyond the circumference of the shaft and the plate restraining the shaft axially at the upper side of the bearing, thus acting in this respect as a holding-down device for the shaft. This plate preferably takes the form of a screw whose head has a larger diameter than the lower end of the shaft.

In addition, this plate can be preferably provided as a thrust plate which, together with a cover plate and/or together with the bearing sleeve, forms a second axial bearing.

It is beneficial if the shaft has a step between a shaft section having a larger diameter and a shaft section having a smaller diameter, the rotor and the thrust plate being disposed on the shaft in the region of the section having a smaller diameter.

The further advantages deriving from the above-mentioned characteristics of the bearing system according to the invention include in particular:

- a means of covering the tapered space by a covering cap or a cover disk and thus lessening the evaporation of lubricant and the risk of lubricant spraying out, due, for example, to shocks to the bearing
- a relative simple method of filling the bearing with lubricant via the tapered space located above.
- a simple means of controlling the filling level of the lubricant in the bearing, since the tapered space is covered by the covering cap or the cover disk only after the lubricant has been filled in.

BRIEF DESCRIPTION OF THE DRAWINGS

Several embodiments of the invention are described in more detail below on the basis of the drawings.

The figures show.

DESCRIPTION OF PREFERRED EMBODIMENTS OF THE INVENTION

Figure 1:
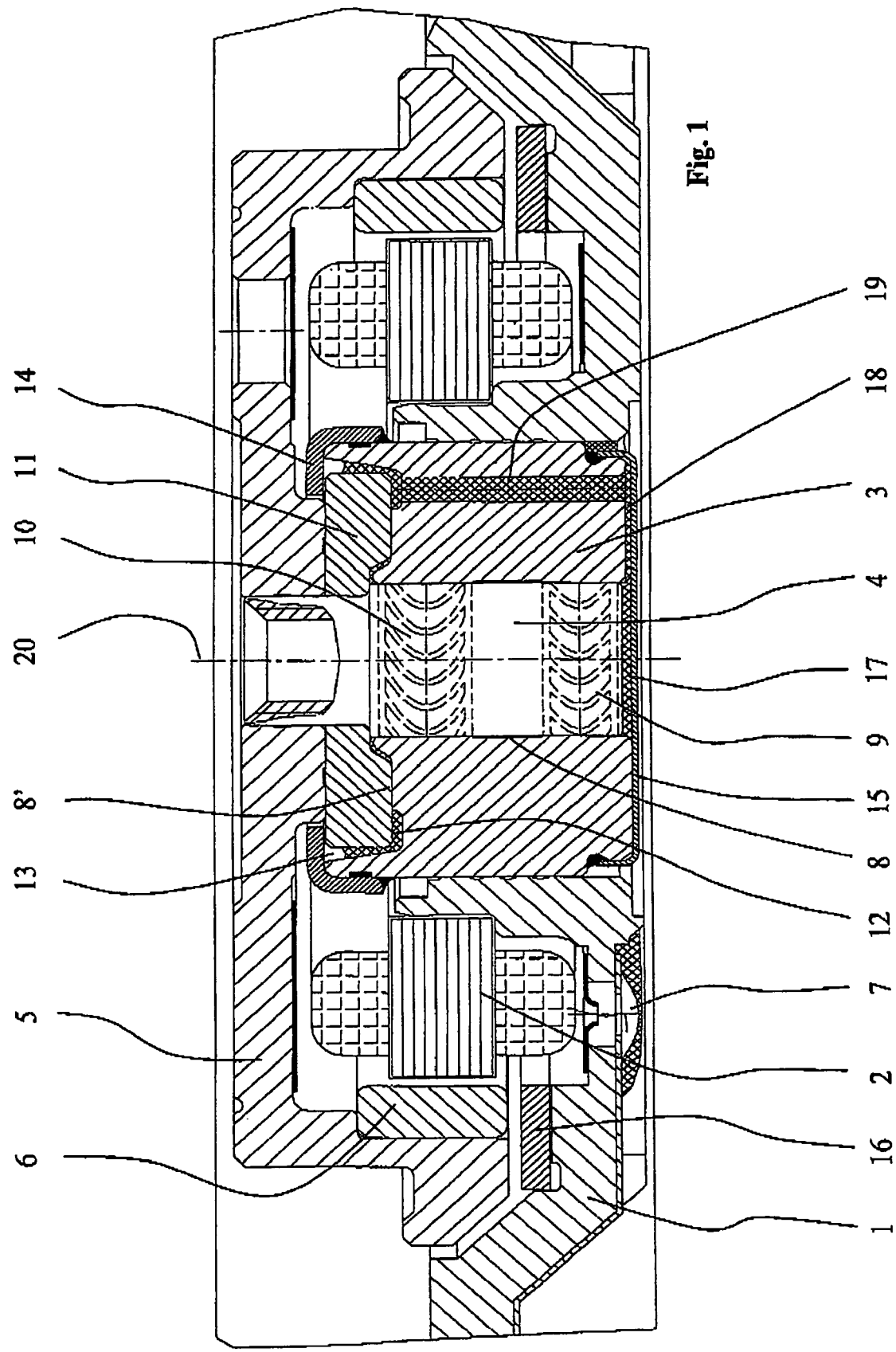
FIG. 1: a spindle motor having a first embodiment of the hydrodynamic bearing system according to the invention.

All the spindle motors illustrated in FIGS. 1 to 6 comprise a stationary baseplate 1 on which a stator arrangement 2 consisting of a stator core and windings is arranged. A bearing sleeve 3 or 3' is firmly accommodated in a recess in the baseplate 1 and has a cylindrical axial bore in which a shaft 4 or 4' is rotatably accommodated. The free end of the shaft 4 or 4' carries a rotor hub 5 or 5' on which one or more platters (not illustrated) of the hard disk drive are arranged and fixed. An annular permanent magnet 6 having a plurality of pole pairs is arranged at the lower inside edge of the rotor hub 5 or 5', an alternating electrical field being applied to the pole pairs by a stator arrangement 2 spaced apart from them by means of an air gap, so that the rotor 5 or 5', together with the shaft 4 or 4', is set in rotation about the rotational axis 20. The stator windings are supplied with power, for example, via electrical contacts 7.

A bearing gap 8 remains between the inside diameter of the bearing sleeve 3 or 3' and the outside diameter of the shaft 4 or 4', the bearing gap 8 being filled with a lubricant. The hydrodynamic bearing arrangement is formed by two radial bearing regions 9, 10 that are marked by a surface structure provided on the surface of the shaft 4 or 4' and/or on the inside surface of the bearing sleeve 3 or 3'. As soon as the rotor 5 or 5', and thus the shaft 4 or 4' as well, are set in rotation, hydrodynamic pressure is built up in the bearing gap 8, or in the lubricant found in the bearing gap, due to the surface structures, so that the bearing can then support a load. The lower end of the bearing system is tightly sealed by a cover plate 15.

In a first embodiment of the invention according to FIG. 1, a thrust plate 11 is provided at the end of the shaft 4 towards the rotor, the thrust plate being disposed below the rotor 5. The thrust plate 11 can be firmly fixed to the shaft 5, either bonded or pressed on for example, or it can also form an integral part of the shaft. Compared to the solution mentioned in the opening paragraphs, the arrangement of the rotor 5 and the thrust plate 11 according to the invention makes it possible to achieve a relatively large joint length for the arrangement on the shaft 4, with the bearing length remaining the same. The thrust plate 11 is accommodated in an annular recess in the bearing sleeve 3 facing the rotor 5. A bearing surface extending approximately perpendicular to the rotational axis 20 is formed on the bottom of the annular recess, this bearing surface interacting with a corresponding bearing surface formed by the lower end face of the thrust plate 11 and thus forming an axial bearing. A radial bearing gap 8' filled with lubricant remains between the bearing surfaces. The bearing surfaces spaced apart from each other by the bearing gap 8' have sections extending radially inwards that merge into surfaces aligned obliquely to the rotational axis and connect the radial section 8' of the bearing gap and the axial section 8 of the bearing gap to each other. Since the upper end face of the thrust plate 11 rests against the rotor 5 and the axial hydrodynamic bearing thus only functions on one side, axial preloading in a "downward" direction can be provided by a permanently magnetic or ferromagnetic component 16 that interacts with the magnets 6.

The bearing surface formed by the end face of the bearing sleeve 3 has a depression taking the form of an annular groove 12. An annular tapered space 13 adjoins the annular groove 12, the tapered space preferably widening in an axial direction, i.e. in the direction of the end face of the bearing sleeve 3. The groove 12 and the tapered space 13 are connected to the bearing gap, the groove 12 being completely, and the tapered space 13 at least partially, filled with lubricant and forming a reservoir and an equalizing volume for the lubricant. Here, the tapered space 13 simultaneously acts as a capillary seal for the bearing gap 8'.

A significant advantage of this design is the fact that the volume of this upper lubricant reservoir can be changed without having to change the axial bearing. An increase in the size of the upper lubricant reservoir, in particular, does not inevitably lead to a decrease in the length of the axial bearing, which would result in lower mechanical stiffness.

In FIG. 1, the conical widening of the annular tapered space 13 is produced by the fact that the bearing surface of the bearing sleeve 3 widens in the direction of the end face facing the rotor 5.

Figure 5:
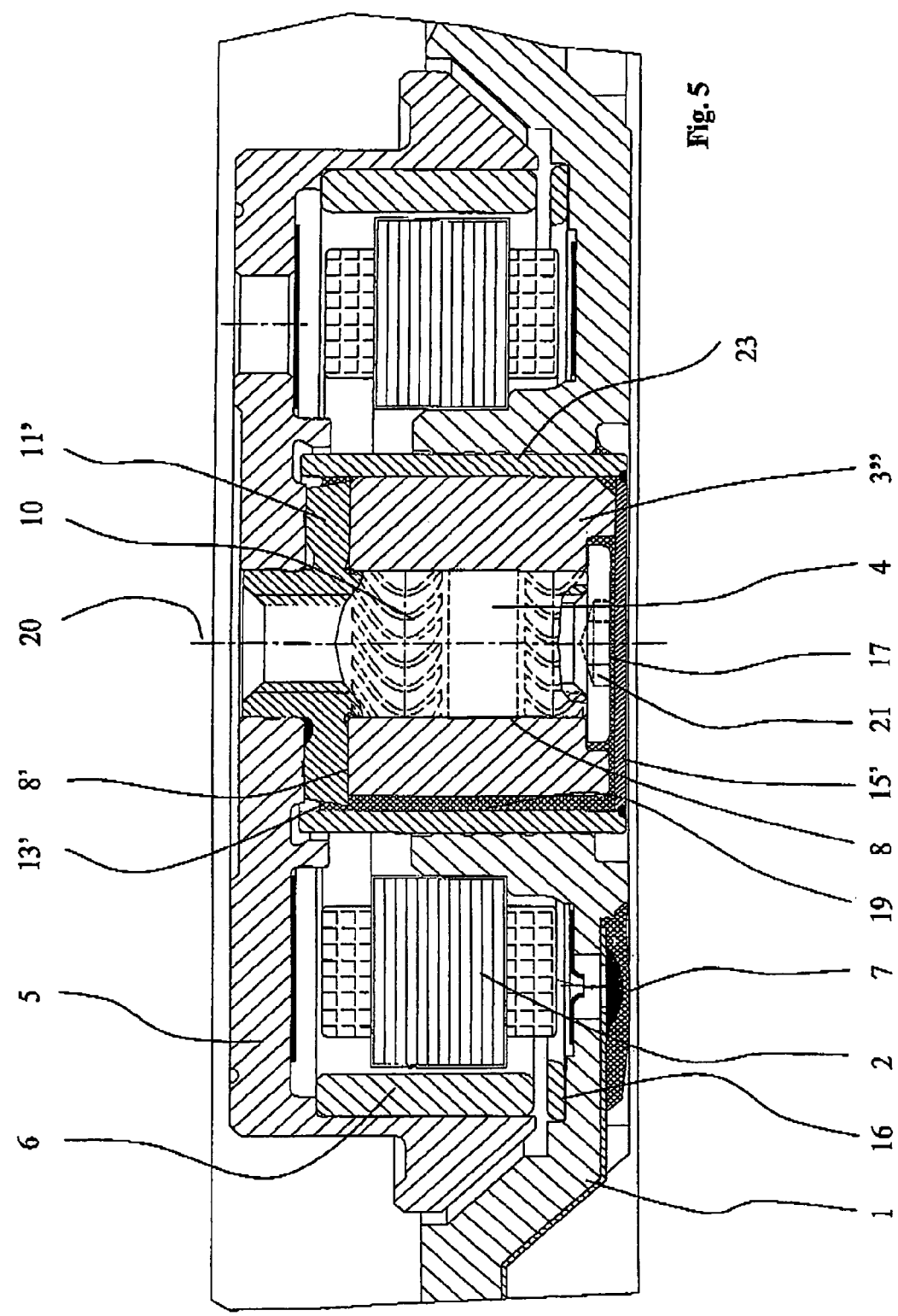
FIG. 5: a spindle motor having a fifth embodiment of the hydrodynamic bearing system according to the invention.
Figure 6:
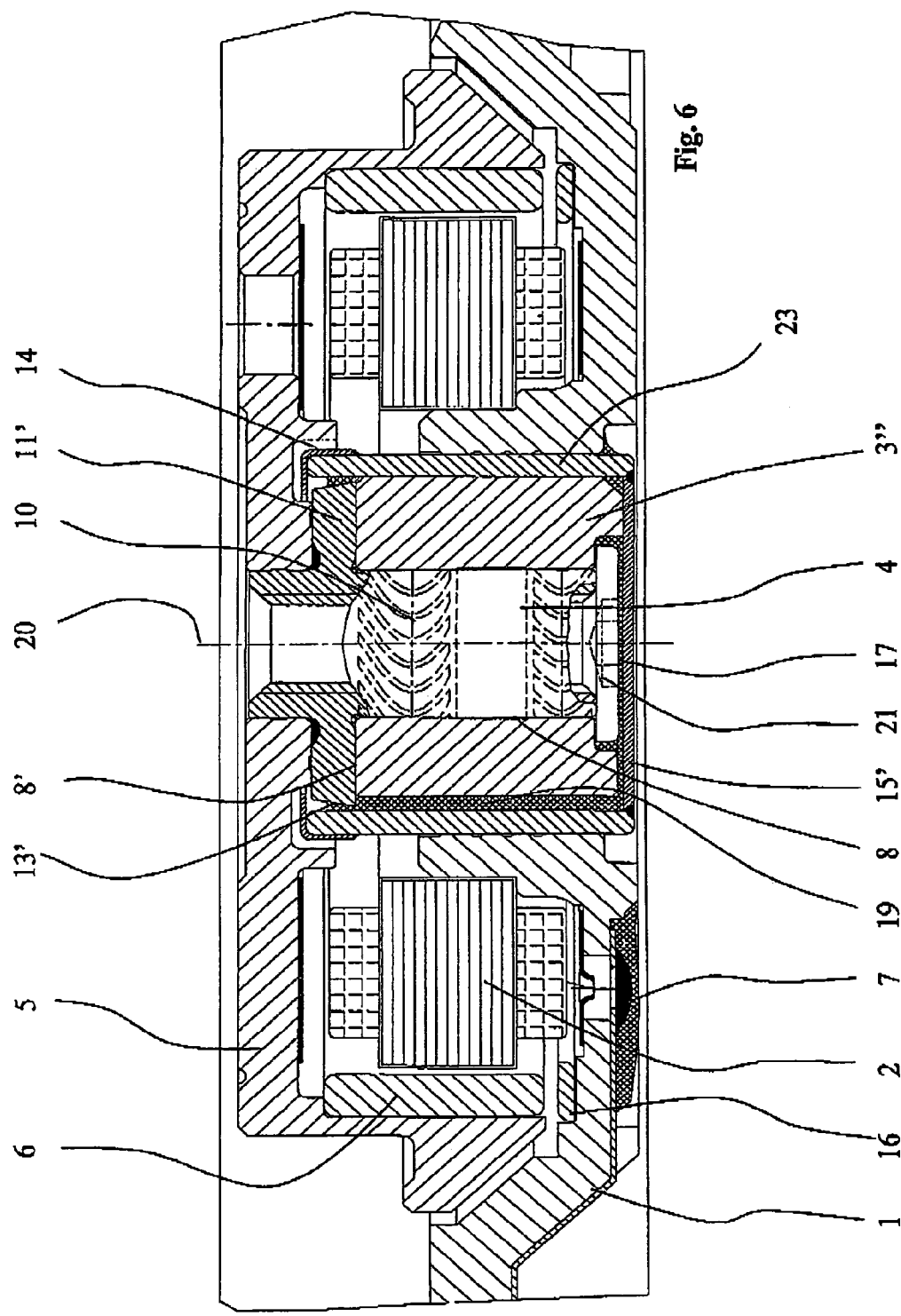
FIG. 6 a spindle motor having a sixth embodiment of the hydrodynamic bearing system according to the invention.

As an alternative, the conical widening of the tapered space 13 in an axial direction, as illustrated for instance in FIG. 5 or 6, can also be produced by the outside diameter of the thrust plate 11 decreasing in an upward direction facing the rotor 5, or by a decrease in the outside diameter of the rotor 5 and a simultaneous increase in the inside diameter of the inner bearing surface in the bearing sleeve 3 in an upward direction facing the rotor 5.

In addition, another possible alternative is to make use of a straight seal.

Another lubricant reservoir is located in a cavity 17 at the closed end of the bearing. This cavity 17 is preferably connected to the annular groove 12 via channels 18, 19, allowing the lubricant to flow freely through the bearing system.

The connecting channel 19 connects the upper radial bearing to the lower lubricant reservoir 17. As an option, this connecting channel 19 can also extend obliquely, i.e. not in an axial direction.

In the embodiment according to FIG. 1, the tapered space 13 is covered by a covering cap 14 which has an approximately L-shaped cross-section and which is set on the end face of the bearing sleeve 3. The covering cap 14 is connected to the bearing sleeve 3, for example, by means of bonding or laser welding. The covering cap 14 extends into an annular gap between the rotor 5 and the thrust plate 11, but is stationary with respect to these two parts and generally does not come into contact with them.

Depending on the embodiment, taking FIG. 1 as an example, this covering cap 14 also acts as a holding-down device for the shaft 4 or for the thrust plate 11, particularly when shocks occur.

Figure 2:
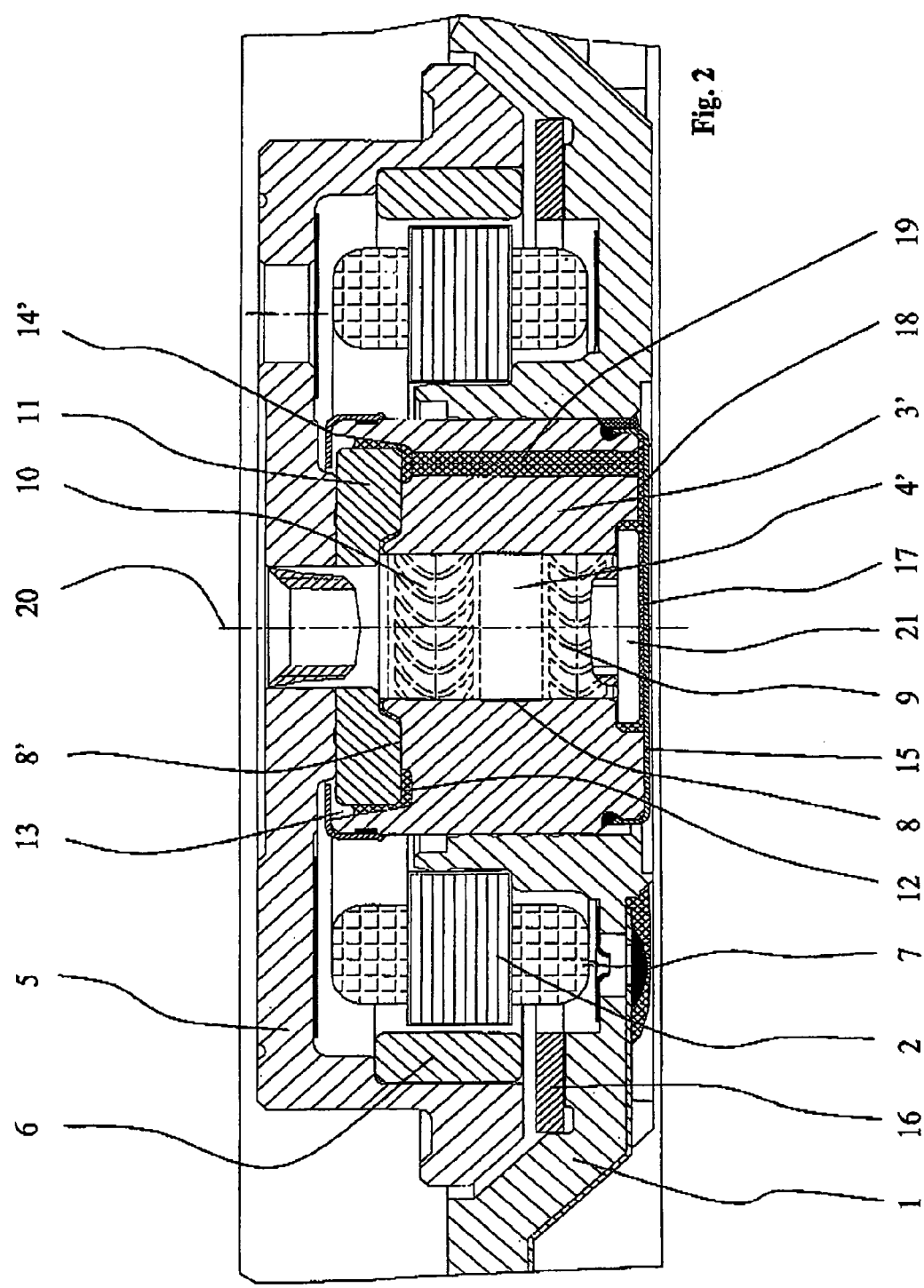
FIG. 2: a spindle motor having a second embodiment of the hydrodynamic bearing system according to the invention.

In the embodiment according to FIG. 2, a plate 21 is provided at the closed end of the shaft 4'. This plate 21, connected to the shaft 4' and arranged in a recess in the bearing sleeve 3', takes the form of a screw that is connected to the lower end of the shaft.

As an option, this plate can be integrally connected to the shaft 4' in a manner not illustrated.

In addition, this plate 21 can be designed as a thrust plate, thus forming a second axial bearing. The counter bearing for the thrust plate 21 is then formed, on the one hand, by the corresponding surfaces of the bearing sleeve 3' and/or by the inner surface of the cover plate 15.

The lubricant-filled cavity 17 again remains below the plate 21, the cavity being connected to the annular groove 12 via channels 18, 19.

Here, the plate 21 is particularly used as a holding-down device for the shaft 4' or for the thrust plate 11, particularly when shocks occur. To the extent that this kind of plate 21 is used, a thinner and thus mechanically less stable covering cap 14' compared to that in the embodiment according to FIG. 1 is sufficient, since the covering cap 14' need no longer take on the function of a holding-down device for the shaft 4'.

Figure 3:
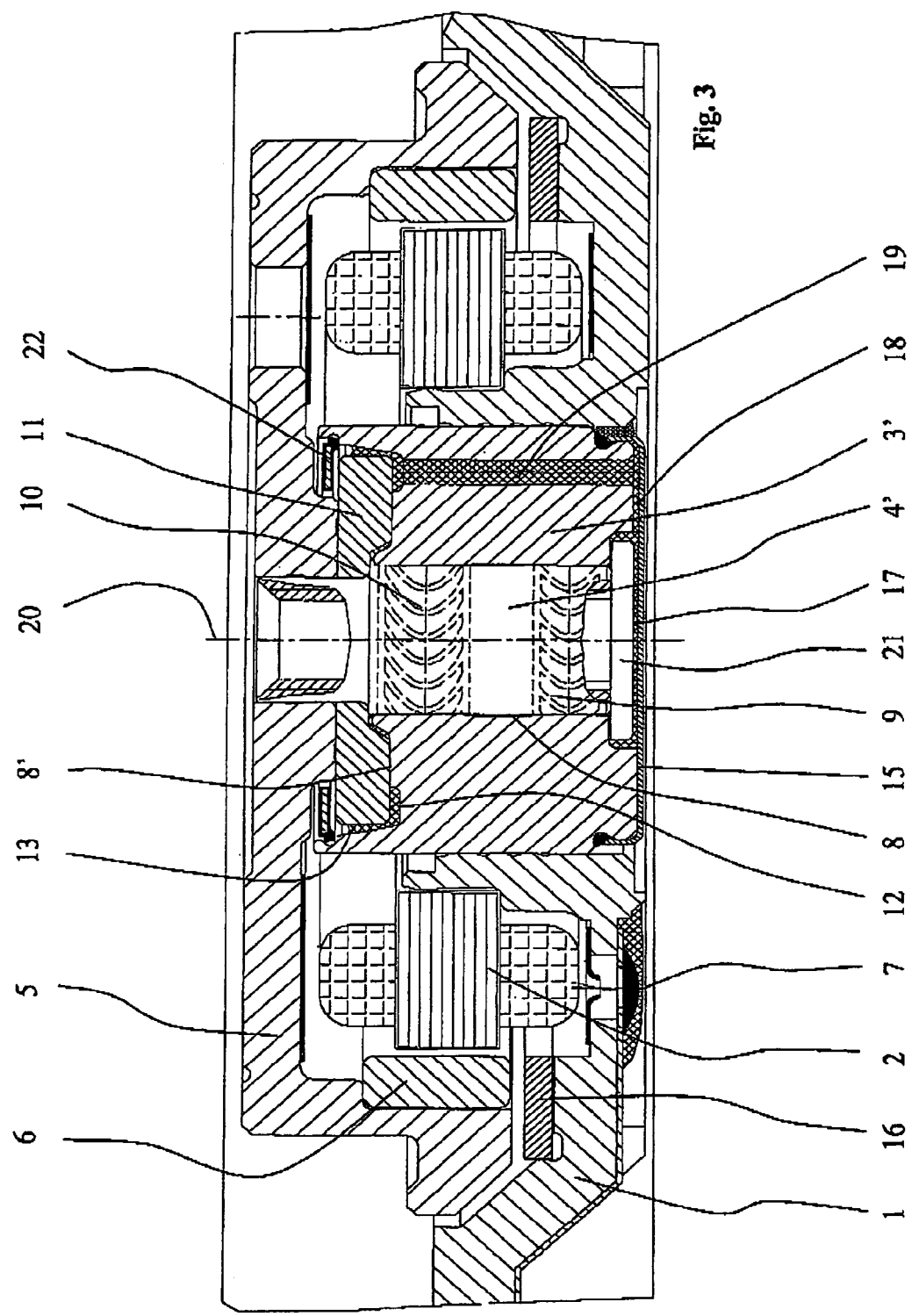
FIG. 3: a spindle motor having a third embodiment of the hydrodynamic bearing system according to the invention.

The embodiment of the spindle motor shown in FIG. 3 is identical to the embodiment according to FIG. 2 except for one feature. The remarks made in reference to FIG. 2 thus equally apply to the spindle motor according to FIG. 3.

A cover disk 22 is used in FIG. 3 to seal the tapered space 13 instead of a covering cap. By using the cover disk 22, the gap between the end face of the bearing sleeve 3' and the underside of the rotor 5 can be made very small so that the length of the radial bearing can be kept large enough despite the second axial bearing. The cover disk 22 is bonded or wedged into an appropriate groove in the inner circumference of the end face of the bearing sleeve 3' or it can be welded, particularly laser welded, to the bearing sleeve 3'.

The cover plate 15 is correspondingly connected to the bearing sleeve 3' by means of bonding, welding or wedging. In addition, a solder point or, alternatively, conductive varnish can be used to connect the bearing sleeve 3, 3' to the baseplate 1 in an electrically conductive way in order to avoid electrostatic charges.

Figure 4:
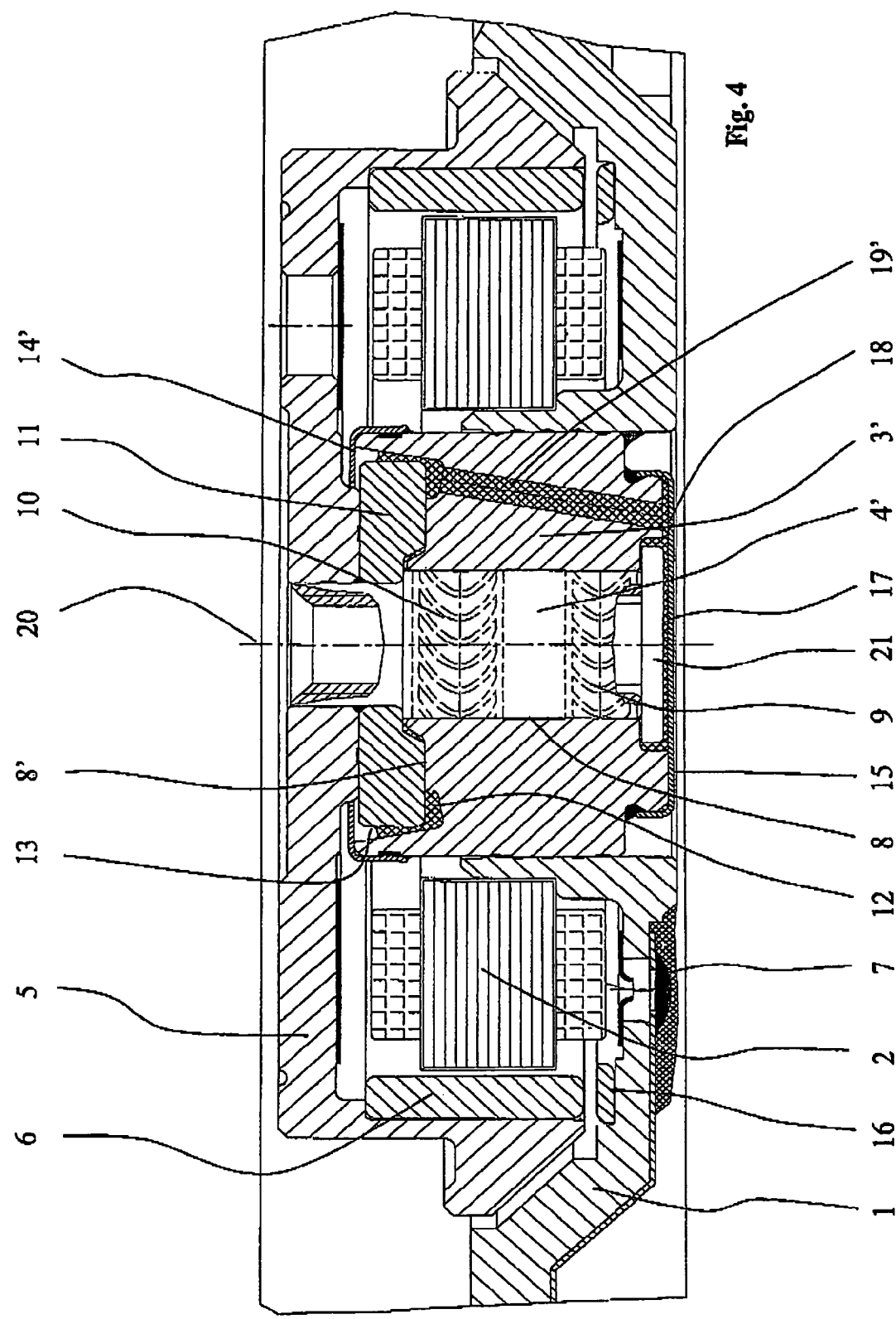
FIG. 4: a spindle motor having a fourth embodiment of the hydrodynamic bearing system according to the invention.

FIG. 4 essentially corresponds to FIG. 2, although in FIG. 4, the connecting channel 19' that connects the upper and the lower lubricant reservoirs does not extend in an axial direction but rather at an angle to the rotational axis 20.

In FIGS. 5 and 6, the upper thrust plate 11' is integrally connected to the shaft. In addition, the upper tapered space 13' (tapered seal) is produced by a narrowing of the upper thrust plate 11' in an axially upward direction 20. Moreover, the bearing sleeve 3'' is enclosed by another cylindrical sleeve 23 that forms an outside boundary for both the upper tapered space 13' as well as the channel 19'. This cylindrical sleeve 23 is inserted into the baseplate 1.

In contrast to the spindle motor in FIG. 6, the spindle motor in FIG. 5 has no further covering cap 14.

IDENTIFICATION REFERENCE LIST

1 Baseplate
2 Stator arrangement
3 Bearing sleeve 3', 3''
4 Shaft 4'
5 Rotor 5'
6 Permanent magnet
7 Contact
8 Bearing gap 8'
9 Radial bearing region
10 Radial bearing region
11 Thrust plate 11'
12 Groove
13 Tapered space 13'
14 Covering cap 14'
15 Cover plate
16 Component
17 Cavity
18 Channel
19 Channel 19'
20 Rotational axis
21 Thrust plate
22 Cover plate
23 Sleeve

The invention claimed is:

1. A spindle motor having a hydrodynamic bearing system, particularly to drive platters in a hard disk drive, the platters being disposed on a rotor (5; 5'), and the bearing system being formed by a bearing sleeve (3; 3'; 3'') arranged on a baseplate (1) and a shaft (4; 4') rotatably supported in an opening in the bearing sleeve and at least one thrust plate (11; 11') connected to the shaft, a liquid lubricant being filled into a bearing gap (8; 8') formed between the shaft, the thrust plate and the bearing sleeve, wherein an annular space (13) is located between an outside diameter of the thrust plate (11; 11') and an adjacent inside diameter of the bearing sleeve (3; 3'), the annular space (13) being tapered and widening in the direction towards the axial end of the bearing sleeve (3; 3') facing the rotor (5; 5') and which is at least partly filled with lubricant and forms a reservoir and an equalizing volume for the lubricant, and a cavity (17) connected to the bearing gap (8) and provided at the closed end of the bearing is connected via connecting channels (18; 19, 19') to an annular groove (12) which is directly connected to the tapered annular space (13), and the thrust plate (11; 11') rests directly against the rotor (5; 5') and is accommodated in an annular recess in the bearing sleeve (3; 3'; 3'') facing the rotor such that the thrust plate rests directly against the bearing sleeve when the motor is stationary.

2. A spindle motor according to claim 1, characterized in that the thrust plate (11') is formed as an integral part of the shaft (4; 4').

3. A spindle motor according to claim 1, characterized in that a bearing surface is formed on the bottom of the annular recess in the bearing sleeve (3; 3'; 3''), this bearing surface interacting with a bearing surface provided on the end face of the thrust plate (11; 11') as an axial bearing or as a conical bearing.

4. A spindle motor according to claim 1, characterized in that the bearing surface located on the bottom of the annular recess in the bearing sleeve (3; 3'; 3") extends approximately perpendicular to the rotational axis.

5. A spindle motor according to claim 1, characterized in that sections of the bearing surfaces of the bearing sleeve (3; 3'; 3") and of the thrust plate (11; 11') that extend radially inwards merge into sections extending obliquely to the rotational axis (20).

6. A spindle motor according to claim 1, characterized in that a bearing surface on the sleeve has a depression taking the form of an annular groove (12).

7. A spindle motor according to claim 6, characterized in that the annular space (13) adjoins the annular groove (12).

8. A spindle motor according to claim 7, characterized in that the tapered annular space (13) is produced by an increase in the inside diameter of the bearing sleeve (3; 3') and/or by a decrease in the outside diameter of the thrust plate (11; 11') in an axially upward direction.

9. A spindle motor according to claim 7, characterized in that the annular groove (12) is completely filled with lubricant and forms a reservoir and an equalizing volume for the lubricant.

10. A spindle motor according to claim 7, characterized in that the tapered annular space (13) forms a capillary seal for the bearing gap (8').

11. A spindle motor according to claim 7, characterized in that the tapered annular space (13) is covered by a covering cap (14; 14') which has an approximately L-shaped cross-section and which is set on the end face of the bearing sleeve (3; 3').

12. A spindle motor according to claim 7, characterized in that the tapered annular space (13) is covered by a cover disk (22).

13. A spindle motor according to claim 1, characterized in that a cavity (17) connected to the bearing gap (8) and provided at the closed end of the bearing is connected via connecting channels (18, 19; 19') to an annular groove (12).

14. A spindle motor according to claim 13, characterized in that the connecting channel (19') extends obliquely to the axial direction.

15. A spindle motor according to claim 1, characterized in that a plate (21) is provided at closed end of the bearing system which projects beyond the outside diameter of the shaft (4; 4').

16. A spindle motor according to claim 15, characterized in that the plate (21) is a thrust plate which forms an axial bearing together with a cover plate (15) and/or together with the bearing sleeve (3').

17. A spindle motor according to claim 1, characterized in that the shaft (4; 4') has a step between a shaft section having a larger diameter and a shaft section having a smaller diameter, the rotor (5; 5') and the thrust plate (11; 11') being disposed on the shaft in the region of the section having the smaller diameter.

* * * * *